United States Patent

[11] 3,627,921

[72] Inventor David R. Weller
Bernardsville, N.J.
[21] Appl. No. 790,974
[22] Filed Jan. 14, 1969
[45] Patented Dec. 14, 1971
[73] Assignee Bell Telephone Laboratories, Incorporated
Murray Hill, N.J.

[54] METHOD OF, AND APPARATUS FOR, TRANSMITTING INFORMATION IN REPRODUCTION SYSTEMS USING ADAPTIVE SCANNING
21 Claims, 8 Drawing Figs.

[52] U.S. Cl. .......... 178/6.8, 178/DIG. 3, 340/146.3
[51] Int. Cl. .......... G06k 9/12, H04n 3/34, H04n 7/12
[50] Field of Search .......... 178/6, 6 BW, 6.8, 7.2, 7.7; 340/146.3, 324.1

[56] References Cited
UNITED STATES PATENTS

| | | | |
|---|---|---|---|
| 3,138,669 | 6/1964 | Rabinow | 179/100.4 |
| 3,422,419 | 1/1969 | Mathews | 340/324 A |
| 3,530,237 | 9/1970 | Redington | 178/7.2 |
| 2,911,463 | 11/1959 | Kretzmer | 178/7.7 |
| 3,239,606 | 3/1966 | Chatten | 178/7.2 |
| 3,295,105 | 12/1966 | Gray | 340/146.3 |
| 3,364,382 | 1/1968 | Harrison | 178/6.8 |
| 3,472,959 | 10/1969 | Stillwell | 178/7.7 |

*Primary Examiner*—Bernard Konick
*Assistant Examiner*—Howard W. Britton
*Attorneys*—R. J. Guenther and R. B. Ardis

ABSTRACT: A method of, and apparatus for, reproducing documents is disclosed. A document is scanned by a flying spot scanner whose beam is modulated vertically during each horizontal scan of the document along the X-axis. The magnitude of the vertical modulation varies as a function of the vertical magnitude of the information encountered during the horizontal scan. The scanned portion of the document is reproduced by unblanking a scope with detected X-data during a horizontal sweep while simultaneously modulating the scope beam vertically.

INVENTOR
D. R. WELLER
BY
ATTORNEY

METHOD OF, AND APPARATUS FOR, TRANSMITTING INFORMATION IN REPRODUCTION SYSTEMS USING ADAPTIVE SCANNING

BACKGROUND OF THE INVENTION

1. Field of the Invention

This invention relates to facsimile transmission and image production, and more particularly to reducing the bandwidth and time required to transmit the data representing information recorded on a scanned medium or document.

2. Description of the Prior Art

Numerous methods and various types of apparatus for reducing the bandwidth and time required to transmit a document are known. Generally, the prior art in this field may be divided into two classes. One is the class composed of methods and apparatus that utilize variable scan rates. The other is the class composed of methods and apparatus that transmit data representing only selected portions of a scanned document.

In a system utilizing a variable scan rate, the rate of scan is varied inversely with the complexity of the document's contents being scanned. The rate of scan is reduced for portions of a document having a high information content and increased for portions of the document having little or no information content. As a result of varying the scan rate in this manner, the resulting data covers a narrower frequency band and requires less of a transmission bandwidth.

An example of a method for transmitting only a portion of the data representing scanned information is shown in S. Kagan et al. U.S. Pat No. 3,347,981, issued Oct. 17, 1967. As the scanner scans a line on the document being transmitted, only the boundary coordinates of a segment containing information are detected. In other words, if a line has information between the coordinates $x_i$ and $x_j$, only these two coordinates are detected. Consequently, transmission of the scanned line segment requires the transmission of only two X-coordinates. At the receiver, these data result in a line segment of length $x_j$–$x_i$ being drawn between the points $x_i$ and $x_j$ on the recording medium. This method eliminates the need for transmitting all the coordinates between $x_i$ and $x_j$ to produce the line segment.

Both of the foregoing techniques transmit the document being reproduced by a fixed number of scans. That is, the vertical displacement of the scanner is the same after the completion of every horizontal scan. Every document will require the same number of scans for transmission, regardless of the information it contains.

SUMMARY OF THE INVENTION

In applicant's invention, the number of scans required to transmit a document is dependent upon the information content of the document. Basically, the invention differs from the prior art in that it utilizes a vertical scan simultaneously with each horizontal scan of a document. Each horizontal scan is accompanied by a plurality of vertical scans of *r* units in magnitude. The magnitude of the vertical scan *r* varies as a function of the information encountered during a horizontal scan.

For instance, the segment extending from $x_i$ to $x_j$ discussed in relation to the Kagan patent could also have a height of *d* vertical units. In other words, the segment could be information in the document having the shape of a rectangle with a length $x_j$–$x_i$ and a height *d*. On a given horizontal scan, the boundary points $x_i$ and $x_j$ are detected. Simultaneously, the vertical scanning is used to detect the height of *d* of the segment. Assuming that *d* is less than the initial vertical scan magnitude, the scan magnitude of reduced to *d* at this point. Since no information with a height less than *d* is detected during the rest of the scan, the vertical scan magnitude will continue to be *d* units. At the end of the horizontal scan, the data $x_i$, $x_j$ and *d* are transmitted to a receiver that uses this information to generate a copy of the scanned segment. Where *d* is such that a plurality of horizontal scans are required to transmit the segment if no simultaneous vertical scanning is used, applicant's invention accomplishes in one horizontal scan what prior art systems require a plurality of horizontal scans to accomplish. This reduces both the amount of transmitted data and the scan time required to transmit a document.

It is an object of the invention to facilitate the transmission and reproduction of information recorded on a medium.

It is another object of the invention to reduce the amount of time required to transmit the contents of a document.

It is another object of the invention to reduce the bandwidth required to transmit the contents of a document.

The most obvious advantages of applicant's invention are that it requires less time and less bandwidth to transmit a given document than prior art systems.

The numerous features, objects and advantages of the invention will become apparent upon considering the drawings in combination with the following description of the invention.

DESCRIPTION OF THE INVENTION

Figure 1:
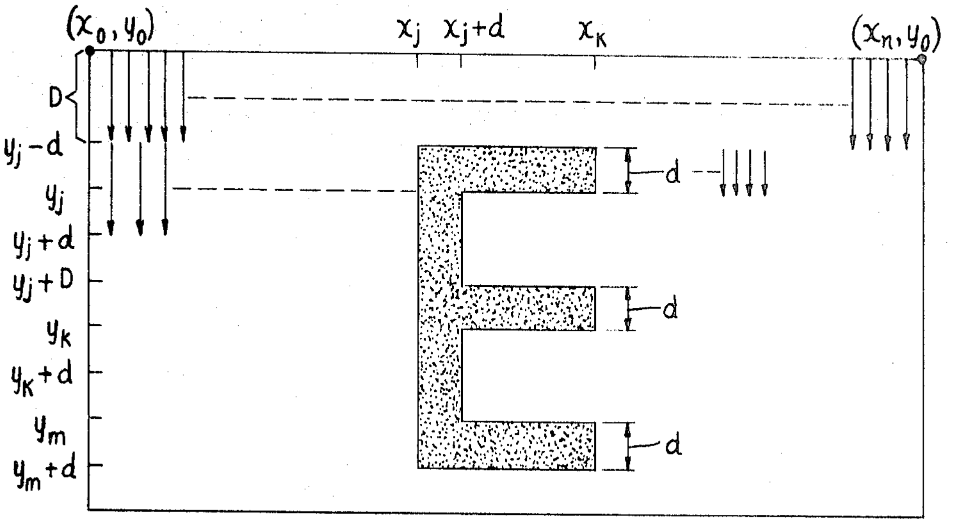
FIG. 1 is a portion of a document which is used in the description of the invention.

FIG. 1 shows a document that is to be transmitted. There are numerous types of well-known scanners that may be adapted for use in the invention. For purposes of explanation, it will be assumed that a flying spot scanner is used to scan the document. The scanner begins its horizontal scan at the point $(x_0,y_0)$ (FIG. 1) and moves across the document to the point $(x_n,y_0)$. After completing this sweep, the scanner returns to the point $x_0$ and is moved a selected distance downward before starting the next horizontal scan.

As indicated in FIG. 1, the scanner beam is simultaneously modulated in the vertical direction as it moves from $x_0$ to $x_n$. The illustrative example shows an initial vertical modulation of D units. Thus, as the beam moves from $x_0$ to $x_n$ on the first scan, it simultaneously varies between $y_0$ and $y_i$–*d*. During this scan, the beam encounters no information and consequently, no data is detected. Since no data is detected, the magnitude of the vertical modulation remains unchanged for the duration of the scan.

At the end of the first scan, the beam returns from $x_n$ to $x_0$ and is displaced vertically a distance D+1. In other words, the beam is now positioned to scan a rectangular portion of the document that is contiguous to the rectangular portion previously scanned. On this second horizontal scan, the beam is again initially modulated D units and moves vertically between the coordinates $y_j$–*d* and $y_j$+*d*. Nothing is detected on this scan until the beam reaches the point $x_j$ where it encounters the left boundary of the letter E. The white-to-black change is sensed and a signal representing the coordinate $x_j$ is stored.

As the beam moves horizontally between $x_j$ and $x_j$+*d*, its simultaneous vertical movement detects no transitions since the entire internal D, between $y_j$–*d* and $y_j$+*d*, is occupied by information. For this condition, the magnitude of the vertical modulation remains D units. However, conditions change when the horizontal movement of the beam passes the point $x_j$+*d*. At this point, only a portion of the interval D, being scanned vertically is occupied by information. In this case the top horizontal finger of E occupies only one-half of the interval D between $y_j$–*d* and $y_j$+*d*. This change is detected by the black-to-white transition resulting from the vertical movement of the beam. Information representing this situation replaces the previously stored vertical data used to vertically modulate the scanner beam. As the beam continues to move horizontally across the document, it is now modulated $d$ units vertically. The stored vertical data producing the $d$ unit vertical modulation remains unchanged for the rest of the horizontal scan since the portion of the interval D occupied by the top finger of the E does not change.

When the beam crosses the rightmost boundary of the top finger of the E, there is a black-to-white transition. Upon the occurrence of this transition, data representing the horizontal coordinate $x_k$ are stored. The horizontal movement of the beam continues until the point $x_n$ is reached. When this occurs, the stored data representing the points $x_j$, $x_k$ and vertical information $d$ are transmitted.

At the receiver, the receipt of this information enables a reproduction means which generates the rectangular segment extending horizontally between the coordinates $x_j$ and $x_k$ (FIG. 2) and having a vertical dimension $d$ extending between $y_j$–$d$ and $y_j$. This segment is represented as rectangle R1 in FIG. 2. Assuming, for purposes of illustration, that figure represents the face of a scope, the scope is controlled as follows. The scope is unblanked at the point $x_j$ on the horizontal sweep and the beam is simultaneously modulated $d$ units vertically. This operation continues until the scope beam passes $x_k$ at which time it is again blanked. In this manner, the rectangle R1 is painted on the face of the scope.

Comparing this segment R1 (FIG. 2) with FIG. 1, it is clear that it represents that portion of the E lying between coordinates $y_j$–$d$ and $y_j$. In other words, a rectangular segment of the E (FIG. 1) with a height equal to the minimum vertical interval occupied by the letter in the portion of the document covered by the second scan has been reproduced.

It should be noted that the reproduction device need not be a scope. It could be any one of numerous different types of output devices. Additionally, it is also obvious that the input data to the reproduction device need not come from the flying spot scanner. The data could be generated by a data processor or any other apparatus capable of supplying the required data in the required format.

While the above reproduction of the transmitted segment is occurring at the receiver, the flying spot scanner returns to point $x_0$ in FIG. 1 and is moved vertically downward $d$+1 units from $y_j$–$d$. It will be recalled, that on the second scan, the scanner was positioned vertically at $y_j$–$d$ and varied vertically between this point and $y_j$+$d$. However, since only the segment of the E (FIG. 1) lying between points $y_j$–$d$ and $y_j$, or a rectangle $d$ unit in height, was transmitted on that scan, it is necessary to start the new scan at $y_j$ to insure the transmission of information covered during the previous scan but not transmitted. In this case, that information is the vertical portion of the E lying between $y_j$ and $y_j$+$d$.

After the beam is positioned, the horizontal scan begins and the beam is again modulated D units. Referring to FIG. 1, on this third scan, the beam is varying vertically between the points $y_j$ and $y_j$+D. As the beam moves from $x_0$ toward $x_n$, it crosses the left boundary of the vertical segment of the E connecting the top and center fingers of the letter. When this occurs, the white-to-black transition results in data representing the point $x_j$ being generated and stored. When the beam crosses the right boundary of the segment, the black-to-white transition results in data representing $x_j$+$d$ being generated and stored.

Simultaneously with the horizontal scanning, the beam is moving vertically between the points $y_j$ and $y_j$+D. It will be noted that the segment of the E (FIG. 1) lying in the interval $[x_j, x_j+d]$ is a rectangle filling the area covered by the vertical scan. Since the height of the segment is D, the minimum vertical component detected by the vertical scanning in that interval is D. Consequently, when the beam passes the point $x_j$+$d$ on its horizontal scan the data representing the vertical scan magnitude is D. This data remains unchanged as the horizontal scan proceeds toward $x_n$ since no other information is encountered.

When the beam reaches the point $x_n$, (FIG. 1), the data representing the points $x_j$, $x_j$+$d$ and D are transmitted and the scanner beam returns to the point $x_0$, $y_j$+(D+1) and starts a new scan. This time, the new scan is displaced a full D units vertically since everything encountered in the preceding D unit vertical scan was transmitted.

Upon receipt of the transmitted data, the receiver begins to reproduce the defined rectangle. It will be recalled that on the prior transmission the receiver generated the top finger of the E shown in FIG. 1. This is the rectangle R1 in FIG. 2. On this reproduction cycle, the scope begins its sweep at the point $(x_0,y_j)$ (FIG. 2) and moves horizontally. When it reaches point $x_j$, it is unblanked and simultaneously modulate D units vertically to reproduce the rectangle R2. After passing the point $x_j$+$d$, the scope is again blanked.

The operations result in a rectangle of height D units and width $d$ units, defined by the transmitted data, being painted on the scope face. This rectangle R2 (FIG. 2) represents the vertical segment of the E (FIG. 1) connecting the top horizontal finger of the letter with the center horizontal finger.

The foregoing has generally described the strategy used in transmitting and reproducing segments of information encountered in scanning a document. The discussion of only three scans is sufficient to clearly indicate the principles involved in the strategy and avoids obscuring the inventive concept with redundant details. It is clear that the remaining three scan necessary to transmit the rest of the E in FIG. 1 are essentially the same as those discussed above, the only difference being the vertical displacement of the beam on the scans.

The fourth scan of the E (FIG. 1), which transmits the center finger of the E, starts at the point $(x_0,y_j+D)$. The next scan, which transmits the vertical segment of the E (FIG. 1) connecting the center finger and the bottom finger, starts at the point $(x_0,y_k)$. Finally, the bottom finger of the E is transmitted on the sixth scan starting at $(x_0,y_m)$.

In the above example, the document was transmitted in six scans with three sets of data being transmitted on five of the six scans. Comparing this with a prior art method requiring a fixed number of scans for any document, such as 66 scans per document, the advantages of applicant's method become clear.

Figure 2:
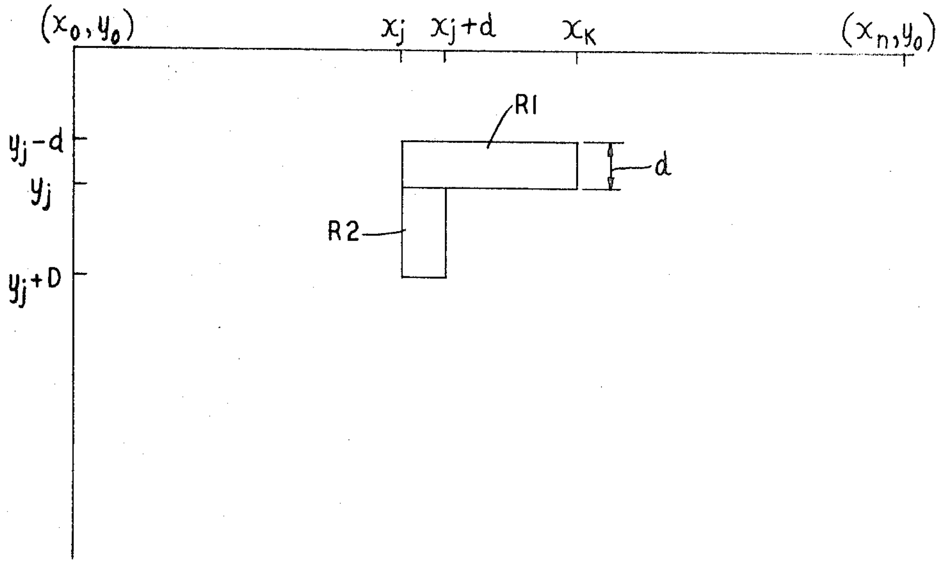
FIG. 2 represents a reproduction of part of the document in FIG. 1 and is useful in describing the invention.
Figure 3:
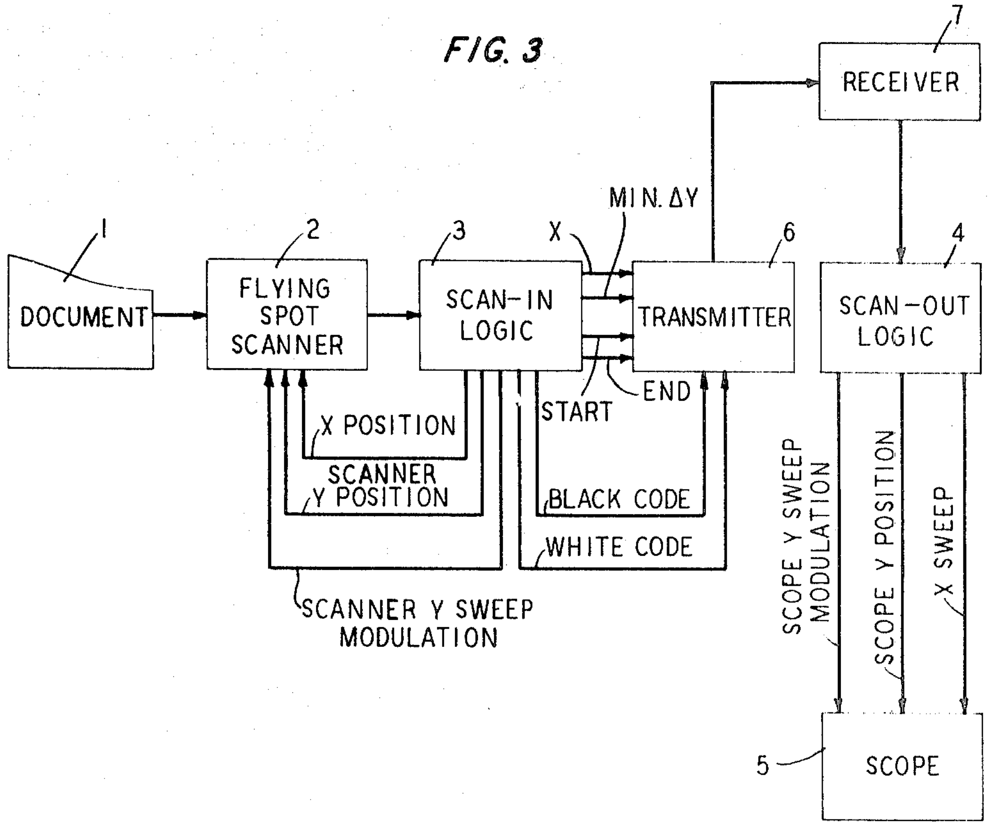
FIG. 3 is a general block diagram of a system implementing the invention.

FIG. 3 shows a general block diagram of a system for carrying out applicant's method. A flying spot scanner 2 scans the document to be transmitted horizontally and simultaneously scans a portion of the document in the vertical direction in response to a signal from the scan-in logic 3. A Y-position signal is also applied to the scanner 2 from the scan-in logic. This is accomplished by using the transmitted data $d$ to modify the scope Y-position signal (FIG. 3). Thus, immediately after completing the second sweep, the scope beam is positioned at the point $(x_0,y_j)$ in FIG. 2. It will be recalled that this point corresponds to the point at which the beam of the scan-in logic 3 (FIG. 3) positions the beam of the scanner in preparation for the third scan of the document.

Operations analogous to those described above will continue until the last scan of the document has been completed. After the resulting data has been transferred to the face of the scope 5 (FIG. 3), the end of scan signal transmitted to indicate the completion of the document scan is used to initialize the scan-out logic 4 (FIG. 3). Among other things, this signal is used to modify the Y-position voltage in such a way that the next sweep of the scope 5 originates at the point $(x_0,y_0)$. With such sweep voltages applied to the scope 5 (FIG. 3), and the various registers in the scan-out logic 4 initialized, the receiving unit is prepared to begin reproducing a new document.

The foregoing provides a general description of the operation of a system implementing applicant's method. The more detailed knowledge of the operation of the scan-in logic 3 (FIG. 3) and scan-out logic 4 will become apparent in considering FIGS. 4 through 8 with the following discussion.

The discussion of the detailed operation of the scan-in logic and scan-out logic will cover only the first two scans of the document discussd above. This is sufficient to illustrate the detailed operation of the apparatus and avoids obscuring the inventive concepts with repetitious details that are well known. More particularly, the Y-position signal positions the beam vertically at a point such as $y_o$ (FIG. 1) and the Y sweep modulation signal produces the vertical sweep between $y_o$ (FIG. 1) and $y_j$–$d$ that occurs simultaneously with the horizontal sweep.

When an X-sweep begins the scan-in logic (FIG. 3) generates a start of scan signal which is stored in the logic 3. Additionally, a white or black code is generated by the logic 3 at the beginning of the horizontal sweep which starts in the white portion of the document. This code is stored for the duration of the horizontal sweep. As the X-sweep progresses from $x_o$ to $x_n$ (FIG. 1), data representing points on the X-axis at which black-to-white or white-to-black transitions occur are also stored in the scan-in logic 3.

Referring to FIG. 1, on the second sweep of this document, data representing $x_j$ and $x_k$ would be stored during the sweep.

It will be recalled that the vertical modulation of the scanner's beam may vary as the beam moves horizontally. Transitions in the character of the document detected by the vertical movement of the beam, such as those detected on the second scan of the document in FIG. 1 in the interval $[x_j,x_k]$, result in the scan-in logic 3 (FIG. 3) varying the magnitude of the vertical modulation. In the specific case mentioned, vertical modulation of the beam is changed from D units to $d$ units (FIG. 1). Data representing $d$ is stored in the scan-in logic 3 and used in generating a signal that is fed back to the flying spot scanner 2 to control the vertical modulation. When the beam reaches the point $x_n$ (FIG. 1), the data $d$ and the stored white code are sent to the transmitter 6 (FIG. 3).

The transfer of the white code and $d$ activates the transmitter 6 which begins to transmit the stored data. In the case of the second sweep of the document in FIG. 1, the transmitter sends the data representing the white code, $d$, $x_j$ and $x_k$ in that order. This information is received at the receiver 7 (FIG. 3) and the scan-out logic 4 generates signals, in response to the data, that control the scope 5.

The foregoing operations described are repeated for each horizontal segment of the document scanned. At the end of the final horizontal scan, an end of scan signal, indicating that the complete document has been scanned, is generated by the scan-in logic 3 (FIG. 3). This signal is transmitted with the data obtained on the final scan and initializes the scan-out logic 4 after the transmitted data has been translated onto the scope 5. This initialization of the scan-out logic 4 prepares the logic for the receipt of data resulting from the scanning of a new document.

In operation, the scan-out logic 4 (FIG. 3) is very similar to that of the scan-in logic 3. For instance, when the first scan of the document in FIG. 1 begins, the scan-out logic 4 has been initialized. Thus, the sweep on the scope 5 is positioned at a point equivalent to $(x_o,y_o)$ in the document being scanned (FIG. 1). At the end of the first scan of the document, no X-data is transmitted since no information was encountered. However, data representing the white code and D, which was the minimum magnitude of the vertical modulation during this scan, is transmitted. This data results in the scope 5 vertical sweep voltage being altered but no trace appears. It will be recalled that the white code indicates that the scan started in a white portion of the document (FIG. 1). This condition plus the absence of X-data further indicates that no information was encountered on the scan.

The alteration in the vertical sweep prepares the scope for a sweep that originates at a point equivalent to $(x_o,y_j$–$d)$ (FIG. 2). The presence of the white code and the absence of X-data results in the scope 5 (FIG. 3) remaining blanked.

The data representing D is also used by the scan-in logic 3 (FIG. 3) to alter the Y-position voltage applied to the scanner 2 at the end of the first sweep of the document (FIG. 1). The altered voltage is such that the scanners sweep is vertically displaced D units to the point $(x_o,y_j$–$d)$ (FIG. 1).

As the second scan of the document in FIG. 1 is completed, data representing the white code, $d$, $x_j$ and $x_k$ are transmitted. When the data is received the presence of the white code and X-data enables circuitry in the scan-out logic 4 (FIG. 3) that generates horizontal sweep voltages. The receipt of the data $d$, in this case, results in a Y-sweep modulation that modulates the scope beam $d$ units vertically simultaneously with the X-sweep.

It will be recalled that this sweep originates at the point $(x_o,y_j$–$d)$ in FIG. 2. When the scope sweep reaches a point $x_j$ in FIG. 2, the transmitted data representing $x_j$ results in the scope being unblanked. The scope remains unblanked until the sweep reaches the horizontal coordinate equivalent to $x_k$. These combined operations result in the rectangle R1 (FIG. 2) being painted on the face of the scope during this sweep. After the scope completes the X-sweep, the beam is returned to the point on the X-axis represented by $x_o$. Additionally, the beam is moved downward $d$+1 units to a point $y_j$ (FIG. 2) on the Y-axis.

Figure 4:
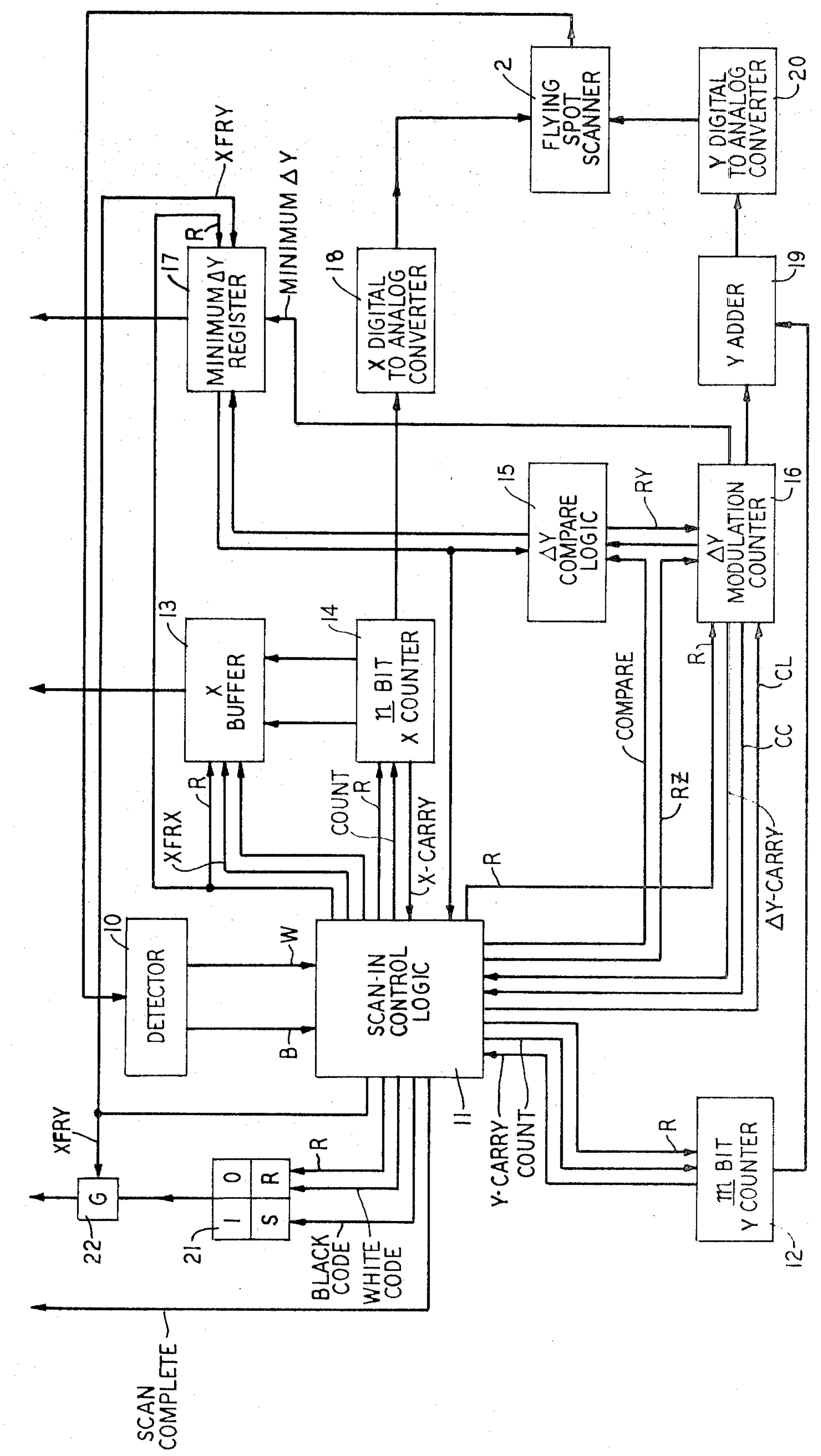
FIG. 4 is a detailed block diagram in the scan-in circuitry of the invention.

It will be recalled that on the first scan of document shown in FIG. 1, the beam of the flying spot scanner 2 (FIG. 3) is initially positioned at the point $(x_o,y_o)$. Additionally, the beam is to be modulated D units vertically during the horizontal scan until it encounters information in the document. At the outset, the scan-in logic shown in FIG. 4, has been initialized by the application of reset signal R. The application of the signal R clears all the flip-flops, registers and counters in the scan-in logic except the minimum ΔY-register 17 (FIG. 4). When R is applied to this register it sets data representing D into the register.

With the above conditions existing, the first scan begins. The flip-flop 21 is reset and contains the white code, which will not change during this horizontal scan, since the scan begins in a white portion of the document (FIG. 1). The scan-in control logic 11 (FIG. 4) generates signals that increment the X-counter 14. The various states occurring in the X-counter 14 during a horizontal sweep represent points along the X-axis and they are applied to a digital-to-analog converter 18. The output of the converter is applied to the flying spot scanner 2, causing its beam to move horizontally.

Simultaneously, the contents of the Y-counter 12 (FIG. 4) which represents a point on the vertical axis, is periodically combined with the contents of the ΔY-modulation counter 16. These operations produce the vertical modulation of the beam during the horizontal sweep. More particularly, at the beginning of the first sweep of the document in FIG. 1, the Y-counter 12 (FIG. 4) contains "0" and, as was mentioned above, the minimum ΔY-counter 17 contains the data D. The "0" in the Y-counter 12 represents the point $y_o$ in FIG. 1. As the horizontal sweep is initiated, a clock begins running that produces clock pulses CL periodically. Upon the occurrence of each clock pulse, the ΔY-modulation counter 16 is incremented and added to the contents of the Y-counter 12 by the Y-adder 19. The resultant sum is applied to the digital-to-analog converter 20. This produces a vertical displacement of the scanner beam.

In addition to the foregoing, the contents of the ΔY-modulation counter 16 are also compared with the contents of the minimum ΔY-register 17. When the modulation counter 16 has been incremented to a value equal to the contents of the minimum ΔY-register 17, the modulation counter 16 is reset. Thus, the contents of the minimum ΔY-register 17, serve as an upper bound for the maximum value the modulation counter can achieve. Where the minimum ΔY-register 17 contains D, the maximum value obtainable in the modulation counter 16 is D. Resetting the ΔY-counter 16 (FIG. 4) returns the scanner beam to a point at which the next downward vertical scan begins.

The combined effect of the above operations is to produce an output from the Y-adder 19 (FIG. 4) that cyclically varies between "0" and D as the scanner beam moves horizontally.

This varying output is applied to a digital-to-analog converter 20 which, in turn, drives the vertical deflection circuitry in the flying spot scanner 2. The application of this varying analog signal results in the scanner beam being varied vertically between zero units and D units simultaneously with its horizontal movement. The result is a path similar to that shown in FIG. 1.

The contents of the ΔY-register 17 (FIG. 4) are altered only after the scanner beam has detected a black-to-white or white-to-black transition in the document. In other words, the vertical modulation of the scanner beam remains unchanged until the beam encounters information in the document. In the specific case under discussion, the contents of the ΔY-register 17 will remain D during the entire first scan of the document in FIG. 1 since no information is encountered on this scan. It will be noted that the vertical modulation of the beam is D units during the entire first scan (FIG. 1).

The Y-counter 12 (FIG. 4) will remain cleared during the first scan. This counter is only changed when a horizontal scan is completed. Additionally, the code store flip-flop 21 will contain the white code at the end of the first scan since the first horizontal scan of the document began in a white portion.

After the X-counter 14 (FIG. 4) has been incremented to a value resulting in a horizontal deflection of the scanner beam to the point $x_n$ (FIG. 1), the next increment will clear the counter and result in the generation of an overflow carry. This carry is applied to the control logic 11 which transfers the contents of the minimum ΔY-register 17 incremented by one into the Y-counter 12. The effect of these operations is to return the beam of the scanner 2 to the point $(x_0,y_f-d)$ in FIG. 1. It will be recalled that this is the starting position of the beam for the second scan of the document.

Specifically, when the second scan of the document (FIG. 1) begins, the X-counter 14 (FIG. 4) contents equal "0," the Y-counter 12 contains D+1 and the ΔY-register 17 contains D.

The generation of a carry by the X-counter 14 (FIG. 4) also results in the scan-in control logic 11 generating a signal XFRY that transfers the contents of code store flip-flop 21 and the minimum ΔY-register 17 to the transmitter 6 (FIG. 3). The transmitter, in turn, transmits the white code and the contents of the minimum ΔY-register 17 to the receiver 7 (FIG. 3). Immediately after this transmission, the scan-in logic generates the signal XFRX which results in the contents of the X-buffer 13 (FIG. 4) being transmitted. In the present case, the white code in flip-flop 21, the data D in the ΔY-register 17, and the all zero condition in the X-buffer 13 which had no data stored in it during the first scan are all transmitted.

Figure 5:
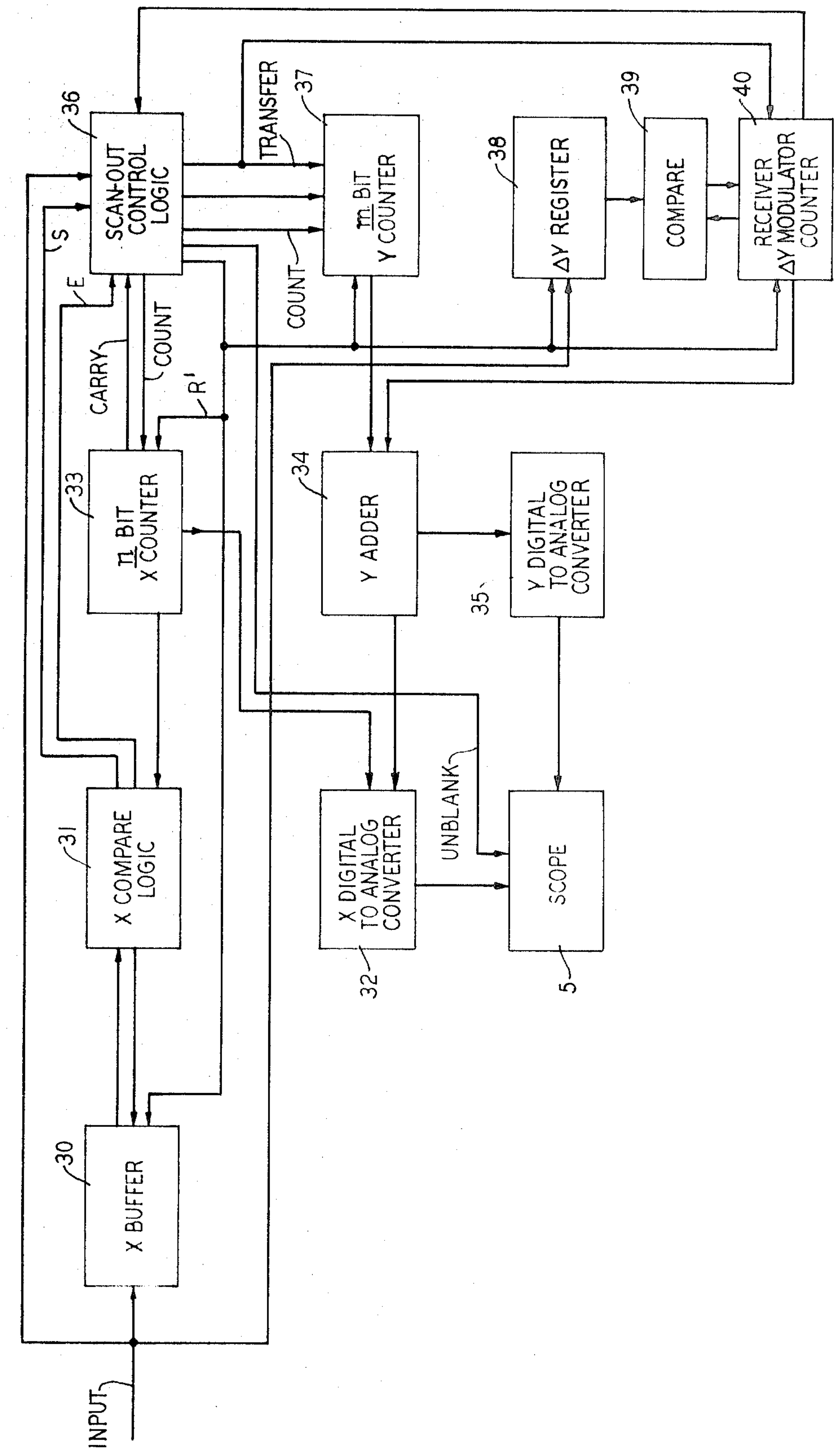
FIG. 5 is a detailed block diagram of the scan-out circuitry of the invention.

Referring to FIG. 5, the received white code and Y information D are applied to the scan-out logic 36. The receipt of these data initiates the scan-out procedure. Application of the white code insures that the scope 5 remains blanked. The receipt of the minimum ΔY-value D without accompanying nonzero X-data results in the scan-logic 36 incrementing the Y-counter 37 by D+1. In other words, since no X-data was received, the first portion of the document (FIG. 1) scanned contained no information and there is nothing to be reproduced. Therefore, the scope remains blanked and its sweep circuitry is not enabled.

The incrementing of the Y-counter 37 by D+1 prepares the reproduction circuitry for information detected on the second scan of the document (FIG. 1). At this point, the Y-counter contains D+1 which would position the beam of the scope at a point equivalent to $y_f-d$ (FIG. 1) on the document if the scope were unblanked. It will be recalled that the beam of the flying spot scanner 2 (FIG. 4) was positioned at $y_f+d$ (FIG. 1) after completing the first horizontal scan of the document. The rest of the reproduction circuitry means in its cleared state.

As was indicated in the general discussion, on the second scan of the document, data representing the points $x_j$ and $x_k$ are stored in the X-buffer 13 (FIG. 4). These points represent the horizontal component of the information in the document lying between the points $y_f-d$ and $y_f+d$ on the vertical axis (FIG. 1). Additionally, the vertical modulation of the scanner beam between these two points results in the quantity $d$ being stored in the minimum ΔY-register 17 (FIG. 4). This data described the top finger of the E (FIG. 1) contained in the scanned document.

Operation of the scan-in logic is essentially the same for this scan as it was during the first scan. As for the first scan, the white code is stored in the flip-flop 21 (FIG. 4) since the second sweep starts in a white portion of the document. The only difference is that X-data is stored in the buffer 13 (FIG. 4), and the value $d$ is stored in the minimum ΔY-register 17 instead of D. Due to initialization of the scan-in logic at the end of the first scan, the minimum ΔY-register 17 contains D at the beginning of the second scan. As the beam of the flying spot scanner moves from left to right on the second scan, a white-to-black transition is detected at the point $x_j$ (FIG. 1). This encounter with information results in the scan-in logic 11 gating the contents of the X-counter 14 into a location in the X-buffer 13 if the Y-modulation counter 16 contains "0." If the Y-modulation counter 16 contains a nonzero quantity, the scan-in logic 11 resets it with a signal RZ, and increments the X-counter 14 by one. After the X-counter has been incremented by one, and the Y-modulation counter reset, the X-counter contents minus one are stored in the buffer 13 if the scanner beam is in a black portion of the document. These operations indicate that a segment of information is encompassed by the scan. IN the case under discussion $x_j$ is stored in the buffer 13. As the scanner beam moves from $x_j$ to $x_f+d$ (FIG. 1), there are no black-to-white transitions and the vertical modulation remains D units.

When the scanner beam passes the point $x_f+d$ (FIG. 1) there will be black-to-white transition while the ΔY-modulation counter 16 (FIG. 4) contains the quantity $d$. The occurrence of this transition at a time when the ΔY-counter 16 contains a nonzero quantity, results in the scan-in logic 11 generating a compare signal. This compare signal enables the compare logic 15 which compares the counter 16 contents with the ΔY-register 17 contents. IN this case the counter 16 contents $d$ are less than the register 17 contents D. Consequently, the compare logic 15 generates a signal RY that results in the D in the register 17 being replaced by the $d$ in the counter 16. Additionally, as was mentioned above, the ΔY-counter 16 is reset simultaneously with the transfer since the counter 16 contained a nonzero quantity at the time of the transition. The X counter 14 is also incremented by one at this time. These operations do not result in a black-to-white transition and no X-data is stored in the buffer 13. In essence, this indicates that the right boundary $x_k$ of the top finger of the E (FIG. 1) being scanned has not yet been encountered.

The scanning process continues just as before with the exception that the Y-modulation has now been reduced to $d$ units as a result of this quantity's presence in the ΔY-register 17. Since no further transition will occur within the interval $[x_j,x_k]$ in FIG. 1 while the scanner beam is modulated $d$ units vertically, the contents of the ΔY-register 17 will remain unchanged.

When the horizontal sweep reaches the point $x_k$ (FIG. 1), data representing $x_k$ will be stored in the X-buffer 13 (FIG. 4) as a result of the transition. Here, as when the scanner beam reached $x_j$, there are two conditions under which the foregoing transition may occur. If the ΔY-counter 16 (FIG. 4) contents equal "0" when the black-to-white transition occurs, the $x_k$ data is transferred to the X-buffer 13 and scanning continues in a regular manner. However, as was mentioned earlier, if the ΔY-counter is not "0" when the transition occurs, it is reset to "0" and the X-counter is incremented one at this point. If the scanner beam is still in a white portion of the document after these operations are performed the contents of the X-counter 16 minus one, or in this case $x_k$, are transferred to the buffer 13. In other words, the right boundary of the information segment is detected and stored.

At this point, the X-buffer 13 (FIG. 4) contains $x_j$ (FIG. 1) and $x_k$ data, and the minimum ΔY-register 17 (FIG. 4) contains $d$. As the second scan of the document (FIG. 1) continues, no other information is encountered. When the scanner beam reaches the point $x_n$ (FIG. 1), the X-counter 14 (FIG. 4) will generate a carry. As was previously mentioned, this carry is used to prepare the scan-in circuitry for the next scan of the document. In response to this carry, the scan-in logic generates a signal that results in the contents of the Y-counter 12 being incremented by $d$+1. Since the X counter contains "0" and the Y-counter containing D has been incremented by $d$+1, the scanner beam is positioned at the point $(x_o, y_i)$ in FIG. 1. This is the point at which the third scan of the document begins.

In addition to the foregoing the scan-in logic 11 (FIG. 4) responds to the X-counter 14 overflow carry by generating the transfer signals XFRY and XFRX which result in the sequential transfer to the white code in flip-flop 21 (FIG. 4), and the Y- and X-information in the register 17 and buffer 13, respectively, to the receiver. In this case white code, the data $d$, $x_j$, and $x_k$ are transmitted in that order.

The receipt and application of the white code and $d$ to the scan-out logic 36 (FIG. 5), when accompanied by X-data, results in the logic generating a signal that enables the receiver ΔY-counter 40. The ΔY-counter 40, like its counterpart in the scan-in logic, counts up through the value of the contents of the ΔY-register and recycles. The white code also insures that the scope 5 (FIG. 5) is blanked at this time.

At the same time $d$ is applied to the scan-out logic 36 (FIG. 5), it is also stored in the ΔY-register 38. Consequently, the ΔY-counter 40 will count from "0" through $d$ repetitively at a rate determined by the frequency of the clock signals CL'. More particularly, each time the counter 40 is incremented, its contents is compared with the $d$ in the ΔY-register 38. When the counter 40 reaches the value $d$, the comparator 39 generates a signal that results in the counter being cleared. Consequently, the input to the Y adder 34 from the ΔY-modulation counter 40 is varying between "0" and $d$.

It will be recalled that at the end of the first scan D+1 was stored in the Y-counter 37 (FIG. 5) in preparation for reproduction of the second scan. These two inputs are applied to the Y-adder 34 whose output drives the Y digital-to-analog converter 35. The resulting analog output signal, which is used as the vertical sweep voltage for the scope, varies the vertical sweep $d$ units from the base point $y_j$–$d$ (FIG. 2).

In addition to the foregoing, the scan-out logic 36 (FIG. 5) also generates a signal that enables the X-counter 33 after receiving the transmitted minimum ΔY. This signal is generated when the transmitted $x_j$ and $x_k$ data arrive and are stored in the X-buffer 30. The presence of X-data in the buffer 30 results in the reproduction circuitry carrying out a sweep operation instead of merely updating the Y-counter as was done for the first scan that resulted in no X-data. As the X-counter 30 is incremented, its contents is compared with the X-data in the buffer 30 representing the leftmost point detected on the X-axis in FIG. 1. In this case, that is the $x_j$ data contained in the buffer 30.

The output of the X-counter 33 (FIG. 5) is applied to the X digital-to-analog converter 32 which produces the horizontal sweep voltage for the scope. Thus, as the X-counter 33 is incremented, the horizontal sweep voltage of the scope 5 increases.

In this case, where the contents of the X-counter 33 (FIG. 5) are being compared with the $x_j$ in the X-buffer 30, the compare logic 31 will generate a signal S when the X-counter 33 reaches a value equal to $x_j$. This signal S is applied to the scan-out logic 36 which responds by generating an unblanking signal to the scope 5.

At the time the unblanking signal is applied to the scope 5 (FIG. 5), the X-counter 33 contains the value $x_j$, the ΔY-register 38 contains the value $d$, and the Y-counter contains the value D+1. Thus, the scope trace first appears at the point $x_j$ (FIG. 2) on the horizontal axis of the scope face and it is being simultaneously modulated $d$ units downward along the Y-axis from a base point $y_j$–$d$ (FIG. 2).

Once the unblanking signal is generated, it continues to exist until there is another signal generated by the compare logic. When the compare logic 31 (FIG. 5) generated a signal indicating that the X-counter 33 contents equaled the $x_j$ in the X-buffer 30, it also generated a signal resulting in the quantity $x_k$ replacing $x_j$ as the quantity to be compared with the X-counter contents. The X-counter 33 continues to be incremented, and after each increment, the value it contains is compared with $x_k$ in the buffer 30. It will be recalled that incrementing the X-counter also moves the unblanked scope beam along the horizontal axis of the scope face. Since, the beam is being simultaneously modulated along the vertical axis, the combined movement results in a rectangle R1 (FIG. 2) having a height $d$ being painted on the scope face.

When the counter 33 (FIG. 5) count reaches the value $x_k$, the compare logic 31 will generate a second signal E. The scan-out logic responds to this signal by turning off the unblanking signal applied to the scope. This establishes the right boundary of the rectangle being painted on the scope face. In FIG. 2, this boundary is shown as the right side of the rectangle R1 appearing at the point $x_k$ on the horizontal axis and extending vertically from $y_j$–$d$ to $y_j$.

Since there are no more X-data in the X-buffer 30 (FIG. 5), the scope will remain blanked for the rest of this sweep. When the X-counter 33 (FIG. 5) exceeds the count $x_n$ (FIG. 1) an overflow carry is generated and the scan-out circuitry is initialized in preparation for the third scan as described earlier. The scan-out circuitry will continue to operate in a manner analogous to the above-described operation until it receives an end of scan signal. This end of scan signal is an overflow carry from the Y-counter (FIG. 4) in the scan-in circuitry. The signal results in the scan-out logic 36 (FIG. 5) generating a reset signal R' that initializes the scan-out logic 36, and clears all the counters, buffers and registers in the scan-out circuitry. This resetting operation prepares the scan-out circuitry for data resulting from the scanning of a new document.

The foregoing detailed description of the operation of the scan-out logic may be summarized as follows. Upon receiving the data resulting from the first scan of the document in FIG. 1, the scan-out logic merely stores the transmitted minimum ΔY-quantity D, incremented by one, in the Y-counter 37 since no X-data was received with the ΔY-quantity. The scope 5 (FIG. 5) is blanked at this time since the white code was received with D. Upon receiving the data $d$, $x_j$ and $x_k$ resulting from the second scan of the document in FIG. 1, the scan-out circuitry unblanks the scope 5 (FIG. 5) beam at the point $(x_j, j_j{-}d)$ (FIG. 2). The scope remains unblanked with its sweep being modulated $d$ units vertically until its sweep has moved horizontally to a point $x_k$ on the X-axis (FIG. 2). At this point the scope 5 (FIG. 5) is again blanked. These operations result in the rectangle R1 (FIG. 2) being painted on the scope face. This rectangle is a reproduction of the top finger of the E (FIG. 1) being transmitted. Transmission of the remainder of the E (FIG. 1) involves operations analogous to those discussed above.

The foregoing description covers a system where a horizontal scan covers the entire width of a document and data is transmitted at the end of each horizontal scan. There are applications where this type of operation becomes inefficient. A specific example is the case where something in the nature of schematic diagrams is to be transmitted. Many diagrams of this type have large areas that contain no information. It is desirable, when transmitting such documents, to transmit data only when information is encountered. The variable width modulation method is easily adapted for use in a way that allows this type of document transmission.

Figure 6:
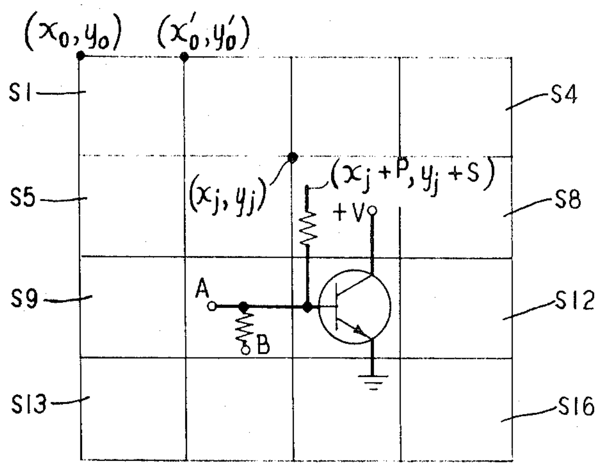
FIG. 6 is used in describing an alternative embodiment of the invention.

Referring to FIG. 6, a schematic diagram is shown that has been divided into 16 sectors S1–S16 for purposes of scanning. The scanning of this document is essentially the same as that previously described except that the schematic is scanned one sector at a time until all sixteen sectors have been scanned.

Scanning begins in sector S1. After this sector has been scanned, sector S2 is scanned and so on until sector S4 has been canned. Upon the completion of the scan of sector S4, sectors S5 through S8 are scanned. Scanning continues in this manner until sector S16 has been scanned at which time a signal is generated indicating that the complete document has been scanned. The general scanning pattern may be though of as a zigzag pattern.

Scanning within each sector is horizontally from the sector's left boundary to its right boundary and vertically from its upper boundary to its lower boundary. The scanner beam is modulated vertically simultaneously on each horizontal scan in the same manner as discussed above.

No information is encountered during the scanning of sectors S1 through S7 of the schematic and, as a result, there is no transmission of data during this period. As sector S7 is scanned, a white-to-black transition occurs indicating that the sector contains information. When this transition occurs, the white code, data identifying the sector S7, and the Y-position of the beam are transmitted. Simultaneously, the X-position of the crossing is stored in a buffer. Additional transitions occurring during this horizontal scan of the sector also result in their X-positions being stored in the buffer. The minimum ΔY is detected and used during the horizontal scan in the same way as was previously described.

At the end of each horizontal scan, the minimum ΔY is transmitted and initiates the sweep operation in the scan-out circuitry. The X-data stored in the scan-in buffer is transmitted sequentially in the same order as it was stored in the buffer and is utilized in the scan-out circuitry in the same manner as described above.

Figure 7:
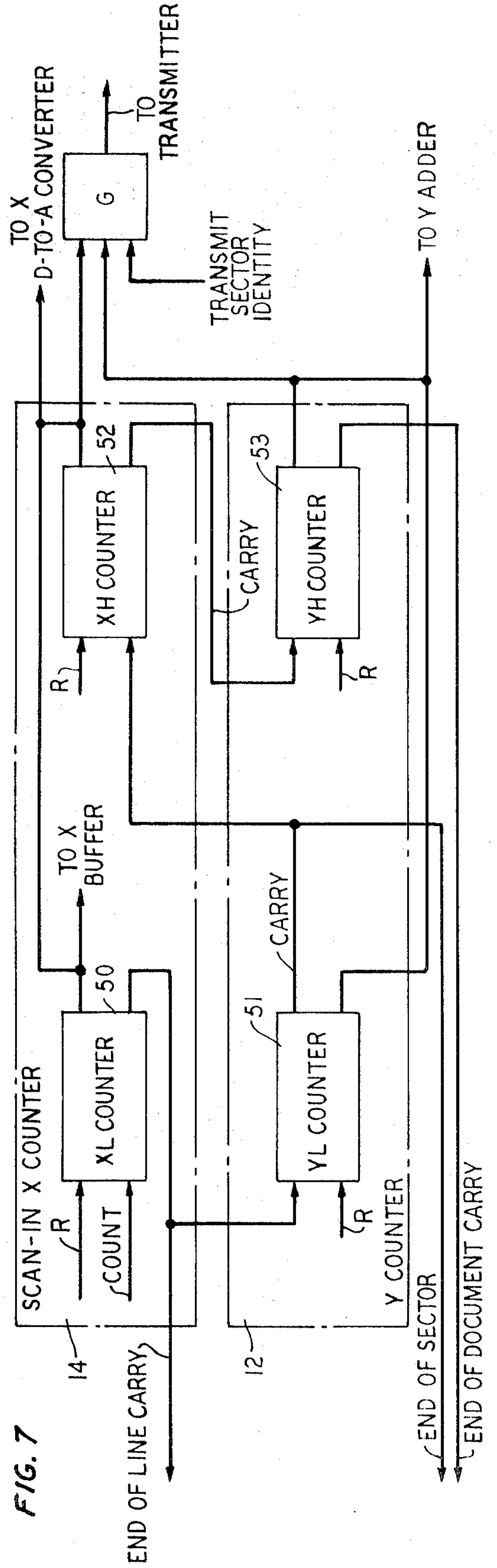
FIG. 7 shows scan-in circuitry used in the alternative embodiment.

The circuitry shown in FIGS. 4 and 5 may be easily modified to operate as described above. This operation is achieved by modifying the X-counters and the Y-counters in the scan-in and scan-out circuitry. The modified scan-in counters are shown in FIG. 7.

Replacing the X- and Y-counters in FIG. 4 with the circuitry in FIG. 7 results in the following operation. When scanning of the schematic (FIG. 6) begins, all the counters in FIG. 7 will be cleared. Thus, the scanner beam will begin at the point $(x_o,y_o)$. As a result of the periodic input from the scan-in logic 11 (FIG. 4), the count in the XL-counter 50 (FIG. 7) increases. As this count increases, the scanner beam moves to the right in sector S1 (FIG. 6). It will be recalled that the beam is being simultaneously modulated vertically by the operation of the ΔY-modulation counter 16 (FIG. 4).

When the XL-counter 50 reaches its capacity, the scanner beam will be located at the right boundary of sector S1 (FIG. 6). The next increment of the XL-counter 50 (FIG. 7) results in it being cleared and an overflow carry being generated. This overflow carry is an input to the YL-counter 51 and results in the YL-counter being incremented by one. Additionally, the XL-counter 50 overflow is the scan-in logic 11 (FIG. 4) which generates a signal that results in the YL-counter 51 being incremented by the contents of the minimum ΔY-register. The performance of these operations result in the scanner beam being returned to the left boundary of sector S1 and displaced vertically by an amount equal to the value of the minimum ΔY-register plus one. In other words, the scanner beam is properly positioned to begin the scan of the sector S1.

This operation continues until the final horizontal scan of the sector S1 is completed. This results in the XL-counter (FIG. 7) being cleared again and the generation of a carry. At this time the YL-counter 51 is filled to capacity and the application of the carry generated by the XL-counter 50 results in the YL-counter's capacity being exceeded. Consequently, the YL-counter 51 is cleared and it generates an overflow carry. The YL-counter 51 carry is applied to the XH-counter and results in it being incremented by one. Incrementing the XH-counter 50 is, in effect, like adding a higher order bit to the X-counter. The XL- and YL-counters are cleared and the XH-counter 50 contains a "1" upon the completion of these operations. This condition positions the scanner beam at the point $(x'_o,y'_o)$ in preparation for scanning sector S2 (FIG. 6).

This type of operation will continue until the last horizontal scan of sector S4 (FIG. 6) is completed. At this point, the XL-counter 50 (FIG. 7) generates an overflow carry which in turn results in the YL-counter 51 generating a carry. The carry generated by the YL-carry is applied to the XH-counter 52 which is filled to capacity. The resulting incrementing of the XH-counter 52 clears that counter and results in the generation of an overflow carry. The carry generated by the XH-counter 52 is applied to the YH-counter 53 resulting in it being incremented by one.

The incrementing of the YH-counter 53 results in the scanner beam being moved downward in preparation for the scanning of the second row of sectors to be scanned. In other words, the one in the YH-counter 53 (FIG. 7) positions the scanner beam at the point $x_o,y_j$ (FIG. 6). The XL-, XH- and YL-counters (FIG. 7) are all cleared at this point and scanning of sector S5 begins. After sector S5 is scanned, sector S6 is scanned.

It will be noted that no transmission has occurred for any of the sectors S1 through S6 scanned (FIG. 6). Since no information was encountered, no black-to-white or white-to-black transitions occurred. This differs from the mode of operation discussed initially where data was transmitted at the end of each horizontal scan of the document whether or not information had been encountered.

Upon the completion of scanning of sector S6, scanning the sector S7 begins (FIG. 7). This sectors contains information, and scanning it will result in the transmission of data. The operation of the scan-in logic containing the modified X- and Y-counters shown in FIG. 7 is the same during the scanning of sector S7 as previously described. When the scanner beam reaches the point $(x_i+P,y_j+S)$ (FIG. 7) a white-to-black transition will be detected. The scan-in logic 11 (FIG. 4) generates a signal that gates the contents of the YL-, YH-, and XH-counters (FIG. 7) to the transmitter for transmission.

At this time, the contents of the XH- and YH-counters (FIG. 7) define the point $(X_i,Y_j)$ shown in FIG. 6. This point identifies the sector in which the transition occurred as sector S7. The contents of the YL-counter 51 defines the Y-axis coordinate $y_j+S$ (FIG. 6) at which the transition occurred. In addition to transmitting the above data, the scan-in circuitry also generates a signal that results in the contents of the XL-counter 50 (FIG. 7) being stored in the X-buffer 13 (FIG. 4). The contents of the XL-counter define the X-axis coordinate $x_i+P$ at which the transitions occurred. After the first transition occurring on a horizontal scan of sector S7, the X-coordinates of any other transitions, white-to-black or black-to-white, are stored in the X-buffer 13 (FIG. 4) varying the vertical modulation of the scanner beam as a function of the vertical magnitude of the information encountered. This operation has been previously described in detail.

At the end of the horizontal sweep being considered for sector S7 (FIG. 6), the contents of the minimum ΔY-register 17 (FIG. 4) and the contents of the X-buffer 13 are transmitted. Here, the contents of the minimum ΔY-register is used to initiate the sweep in the scan-out circuitry and determine the vertical modulation of the sweeep just as it was in the embodiment that did not use the sector concept in scanning. Similarly, the X-data in the X-buffer 13 (FIG. 4) is used for unblanking and blanking the scope in the scan-out circuitry.

Figure 8:
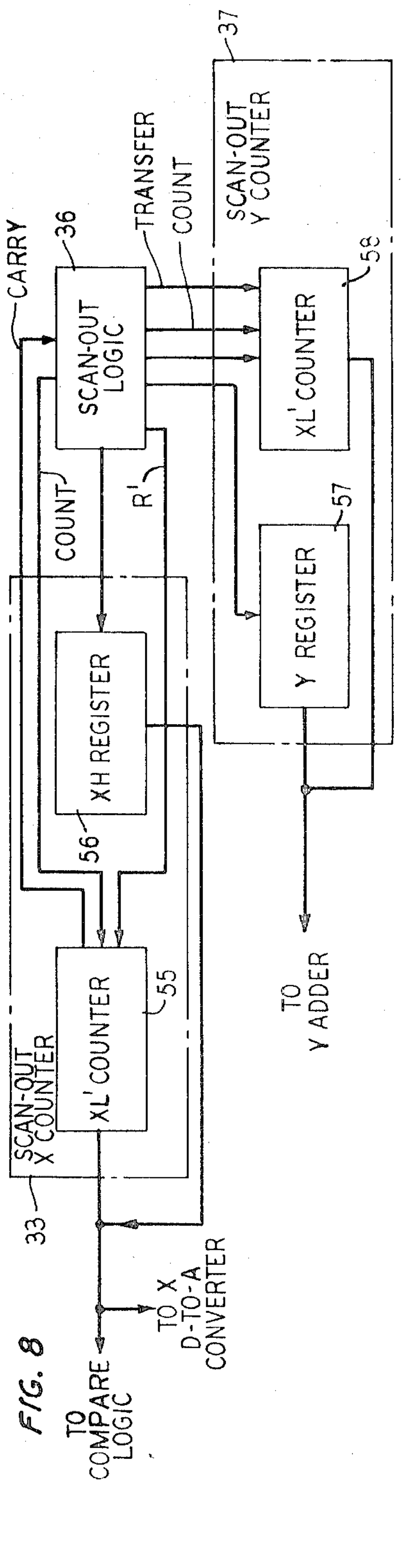
FIG. 8 shows scan-out circuitry used in the embodiment.

The modified scan-out circuitry necessary to utilize the data transmitted by the modified scan-in circuitry is shown in FIG. 8. Again, the modifications are confined primarily to the X- and Y-counters in the scan-out circuitry.

When the contents of the YL-, XH- and YH-counters 51, 52, and 53 (FIG. 7) respectively, transmitted on the initial detection of information are received, the scan-out circuitry responds in the following manner. The scan-out logic 36 (FIG. 8) transfers the transmitted contents from the counters 51, 52, and 53 (FIG. 7) into their counterparts 58, 56 and 57 in the scan-out circuitry. Data representing the coordinates $x_i$ and $y_i$ (FIG. 6) are transferred into the XH-register 56 and YH-register 57 (FIG. 8), respectively. The contents of these registers represent the most significant bit positions in the scan-out X- and Y1counters. Similarly data representing the Y-coordinate $y_j$+S is transferred into the YL'-counter 58 (FIG. 8).

Putting these data into the scan-out registers 56 and 57 and the counter 58 results in sweep voltages being applied to the scope 5 (FIG. 5) which would position the scope beam at a point on the scope face corresponding to the point ($x_i$+P, $y_j$+S) in FIG. 6 if the scope were unblanked. Thus, the scan-out circuitry is prepared to receive the minimum ΔY and X-data resulting from the horizontal scan of sector S7 (FIG. 7). The scan-out circuit operation in actually reproducing the transmitted portion of sector S7 (FIG. 6) is essentially the same as the unmodified scan-out circuitry (FIG. 5) discussed above.

The foregoing discussion has shown the concepts upon which applicant's invention is based and means for implementing the concepts. It is possible to reduce both the time and the bandwidth required to transmit a document if on each horizontal scan of the document, there is a simultaneous vertical scan whose magnitude varies as a function of the vertical magnitude of the information encountered. This type of variable vertical modulation scanning may be used where one horizontal scan covers the entire width of the document and data is transmitted at the end of each horizontal scan. Additionally, this type of scanning is also adaptable for use where a document is subdivided into sectors, scanned on a sector basis and data transmission occurs only for those sectors containing information. The invention is potentially valuable in numerous fields ranging from document reproduction to integrated circuit mask generation and character generation.

Numerous other applications and adaptions, all within the spirit and scope of the invention, will be apparent to one skilled in the art upon reading the foregoing description.

What is claimed is:

1. In combination:;

means for simultaneously scanning a medium along a first axis and, with limited magnitude, along a second axis;

means for detecting the magnitude of selected characteristics of the medium along the scanned portion of said second axis when said characteristics are encountered; and means for altering the magnitude of the scan along said second axis during the simultaneous two dimensional scanning when the detected magnitude is less than the scan magnitude.

2. The combination of claim 1 further comprising;

reproducing means periodically responsive to data representing said scan magnitude along said second axis for sweeping along one axis while simultaneously sweeping repetitively along another axis a distance that is a function of said scan magnitude.

3. A system for producing information in graphic form comprising:

means for generating data representing selected points on a first axis that identify selected boundaries of a plurality of selected information segments;

means for generating data *d* representing the greatest distance, along a second axis, contained within all boundaries of all said information segments; and means responsive to said data for producing said plurality of information segments on a medium, which means records in one uninterrupted sweep on said medium in intervals along one axis related to said selected points on said first axis while simultaneously recording along another axis, in said intervals, a distance related to said length *d*.

4. In a system for producing graphical information on a medium;

recording means;

data representing coordinates on a first axis that identify selected boundaries of a plurality of selected graphic segments;

data *d* representing a selected maximum distance, along a second axis, common to all said graphic segments;

means responsive to said data representing the boundary coordinates of said plurality of selected graphic segments for activating said recording means as it traverses selected portions of said medium in one uninterrupted sweep along one axis; and means responsive to said data *d* for repetitively deflecting the activated recording means a selected distance along another axis from a point on that axis.

5. In a document reproduction system, the combination comprising;

a scanner;

means for controlling said scanner that produces a scan along the horizontal X-axis and a scan of D units along the vertical Y-axis of a document simultaneously;

means for detecting the Y-axis magnitudes of information segments encompassed by the two-dimensional simultaneous scan; and means for reducing the Y-axis scan magnitude of D units during said simultaneous scanning when a detected magnitude is less than D.

6. In a document reproduction system, the combination comprising;

means for scanning a document along its horizontal X-axis and D units along its vertical Y-axis simultaneously;

means for detecting the X-axis coordinates of information segments boundaries when such a segment is encountered;

means for storing the detected X-data;

means for detecting the magnitude *d* of each encountered information segment along said Y-axis that is within the D unit Y-axis scan;

means for comparing *d* with D; and means responsive to the comparison for reducing the Y-axis scan magnitude from D units during the two-dimensional simultaneous scanning to *d* units when *d* is less than D.

7. The system of claim 6 further comprising;

means for transmitting the stored X-data and the data *d* when the scan of the document reaches a selected point on said X-axis reproducing means responsive to the transmitted data that sweeps the horizontal axis of the medium upon which said document is being reproduced while simultaneously sweeping along the vertical axis of said medium *d* units.

8. The system of claim 7 wherein said reproducing means comprises;

a scope;

means for unblanking said scope at points on the horizontal sweep of its beam that are a function of the transmitted X-date; and means responsive to the transmitted data *d* for producing a plurality f *d* unit vertical sweeps during said horizontal sweep.

9. In a system for producing graphical information on a scope;

data representing the X-coordinates of selected boundaries of a plurality of selected graphic segments;

data *d* representing a selected maximum distance, along the Y-axis common to all said graphic segments;

means responsive to said data representing said X-coordinates for unblanking the scope beam during a plurality of selected intervals of a horizontal sweep originating at a point $(x_i, y_j)$ on the scope face; and means responsive to said data *d* for repetitively deflecting the scope beam a selected distance along the Y-axis from the point $y_j$ during the intervals said beam is unblanked.

10. A document reproduction system comprising;

means for scanning a document along its horizontal X-axis and D units along its vertical Y-axis simultaneously;

means for initiating a two-dimensional scan of said document at the point $(x_0, y_j)$;

means for detecting the X-axis coordinates the information segment boundaries when such a segment is encountered;

means for detecting the minimum information segment magnitude $d$ along said Y-axis encountered during said scan; and means for initiating the next scan of said document at the point $(x_0, y_f+d+1)$ upon completing said scan.

11. The system in claim 10, wherein said document is subdivided into $m$ sectors, where each sector extends $r$ units horizontally and $s$ units vertically, further comprising;

means for repetitively generating an $r$ unit horizontal scan of a first sector;

means for generating a signal when $s$ vertical units have been scanned; and means responsive to said signal for initiating the scanning of a second sector contiguous to said first sector.

12. The system of claim 11 further comprising;

transmission means;

means responsive to the detection of the initial one of said X coordinates during a scan of a sector for generating signals identifying the sector being scanned; and means for generating a signal at the end of the horizontal scan of the sector;

where said transmission means transmits said signals identifying said sector upon their being generated and transmits the X-coordinates and minimum magnitude $d$ detected during said scan upon the generation of said signal at the end of said horizontal scan.

13. The system of claim 12 further comprising;

means for reproducing the scanned information segments on a medium;

means responsive to the transmitted signals identifying the sector being scanned for preparing the reproducing means to reproduce the scanned information segments in a selected sector of said medium; and means responsive to the transmitted X-coordinates and minimum magnitude $d$ for controlling said reproducing means in such a way that it simultaneously sweeps said medium $r$ units horizontally and $d$ units vertically.

14. The system of claim 13 wherein aid means for reproducing reproduces information segments at points on the $r$ unit horizontal scan that are a function of said transmitted X-coordinates.

15. A method of reproducing information recorded on a medium comprising the steps of;

1. scanning a portion of the medium by scanning along a first axis while simultaneously scanning a selected distance along a second axis;
2. determining the magnitude of a selected characteristic of the medium along said second axis, within the bounds of the scan along that axis, when said selected characteristic is encountered; and
3. reducing the distance of the scan along said second axis during the scanning of said portion of said medium when said magnitude of the encountered characteristic is less than said selected distance being scanned along that axis.

16. A method of producing graphic segments on a medium comprising the steps of;

1. generating data representing the coordinates, on a first axis, of selected boundaries of a plurality of selected graphic segments;
2. generating data $d$ representing a selected maximum distance, along a second axis, common to all said graphic segments; and
3. translating the data $d$ and the coordinate data for said plurality of selected graphic segments into graphic images on said medium by recording in one uninterrupted sweep along one axis in intervals relates to said coordinate data while repetitively recording a selected distance along another axis from a selected point on such axis, where said selected distance is relates to said data $d$.

17. A method of reproducing information recorded on a medium comprising the steps of;

1. scanning a portion of the medium along a first and second axis simultaneously, where the scan magnitude along said second axis is D units;
2. detecting the point on said first axis at which there is a transition in the character of the medium from a first characteristic to a second characteristic;
3. detecting the minimum magnitude $d$ of said second characteristic along said second axis encountered during the scan along said first axis;
4. changing the scan magnitude along said second axis from D units to $d$ units during the simultaneous two-dimensional scanning; and
5. detecting the point on said first axis at which a transition from said second characteristic to said first characteristic of the medium occurs.

18. The method of claim 17 further comprising the steps of;

1. storing the detected points on said first axis at which transitions in the character of said medium occurs;
2. storing said minimum magnitude $d$; and
3. transmitting said stored points and said minimum magnitude $d$ when the scan reaches a selected point on said first axis.

19. The method of claim 18 further comprising the step of;

4. enabling an image producing means responsive to the transmitted data which scans along a first and a second axis simultaneously, where the placement of the image produced on said first axis is a function of said transmitted points and the magnitude of said image along said second axis is a function of $d$.

20. A method of reproducing a document comprising the steps of;

1. scanning a document vertically D units along its vertical Y-axis simultaneously with each horizontal X-scan of the document;
2. detecting points on the X-axis that define the placement of information segments on this axis which are encountered during the scan;
3. detecting when the magnitude of said information segments along said Y-axis is less than the D unit Y scan; and
4. reducing the magnitude of the Y-scan during the simultaneous two-dimensional scan from D units to the detected magnitude.

21. The method of claim 20 further comprising this steps of;

5. transmitting the detected points on said X-axis and the Y-scan magnitude when the horizontal scan reaches a selected point on the X-axis,
6. translating the transmitted data into a visual image of said scanned information segments by utilizing said detected points and Y-scan magnitude to control the simultaneous horizontal and vertical scanning, respectively, of a reproduction means.

* * * * *

UNITED STATES PATENT OFFICE

CERTIFICATE OF CORRECTION

Patent No. 3,627,921 Dated December 14, 1971

Inventor(s) D. R. Weller

It is certified that error appears in the above-identified patent and that said Letters Patent are hereby corrected as shown below:

Column 1, line 63, "height of d" should read --height d--; line 65, "magnitude of" should read --magnitude is--.

Column 2, line 42 "($X_n$,$Y_o$)" should read --($X_n$,$Y_0$)--; line 43, "$X_o$" should read --$X_0$--; line 67, "internal" should read --interval--.

Column 4, line 29, "scan" should read --scans--; cancel line 52 through column 5, line 5.

Column 5, line 6, should read --More particularly, the Y-position signal positions the--; line 17, "$X_o$" should read --$X_0$--.

Column 6, line 21, insert column 4, line 50 through "known" of column 5, line 6.

Column 7, line 68, "$y_j$+d" should read --$y_j$-d--; line 70, "means" should read --remains--.

Column 8, line 4, "described" should read --describes--; line 27, "IN" should read --In--; line 38, "IN" should read --In--.

Column 9, line 16, "to" should read --of--.

Column 11, line 1, "canned" should read --scanned--; line 5, "though" should read --thought--.

UNITED STATES PATENT OFFICE
CERTIFICATE OF CORRECTION

Patent No. 3,627,921 Dated December 14, 1971

Inventor(s) D. R. Weller PAGE - 2

It is certified that error appears in the above-identified patent and that said Letters Patent are hereby corrected as shown below:

Column 12, line 27, "sectors" should read --sector--; line 37, "$(X_I, Y_j)$" should read --$(x_i, y_j)$--; line 45, "transitions" should read --transition--; line 57, "sweeep" should read --sweep--.

Column 13, line 1, "X-" should read --X--; line 2, "Ylcounters" should read --Y counters--; line 31, "adaptions" should read --adaptations--.

Column 14, line 26, "segments boundaries" should read --segment boundaries--; line 39, "X-axis," should read --X axis;--; line 51, "plurality f" should read --plurality of--; line 58, "Y-axis," should read --Y axis;--; line 74, "coordinates the" should read --coordinates of--.

Column 15, line 38, "aid" should read --said--.

Column 16, line 5, "relates" should read --related--; line 8, "relates" should read --related--; line 53, "this" should read --the--; line 56, "X-axis," should read --X axis;--.

Signed and sealed this 11th day of July 1972.

(SEAL)
Attest:

EDWARD M. FLETCHER, JR.
Attesting Officer

ROBERT GOTTSCHALK
Commissioner of Patents